UNITED STATES PATENT OFFICE.

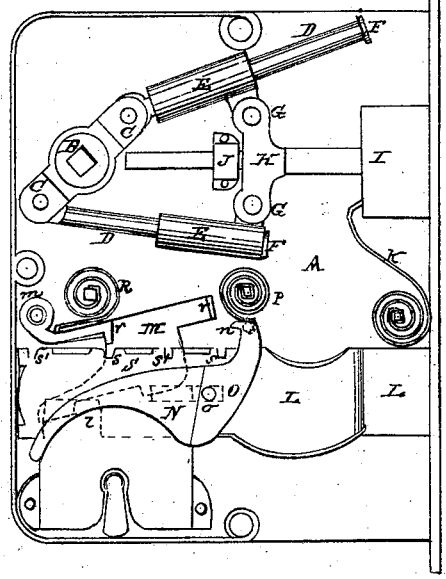

TANNIS A. OLSON, OF BELOIT, WISCONSIN.

IMPROVEMENT IN DOOR-LOCKS.

Specification forming part of Letters Patent No. 116,214, dated June 20, 1871.

*To all whom it may concern:*

Be it known that I, TANNIS A. OLSON, of Beloit, in the county of Rock and State of Wisconsin, have invented certain new and useful Improvements in Locks; and I do hereby declare the following to be a full and correct description of the same, sufficient to enable others skilled in the art to which my invention appertains to fully understand and construct the same, reference being had to the accompanying drawing which makes part of this specification, and in which—

Figure 1 is a side elevation of my improved lock, the side plate being removed to show the operative parts. Fig. 2 is a similar view, the parts being in different positions; and Fig. 3 is a side elevation of the key.

Like letters of reference indicate like parts in the several figures.

My invention relates more especially to that class of locks known as mortise-locks; and it consists, first, in the peculiar device for operating the latch-bolt; second, the peculiar construction of the parts of the lock, as hereinafter more fully described.

A in the drawing represents one side plate of the lock, which is provided with the usual opening to receive the hub B. This hub is constructed with two arms, C, to the ends of which are pivoted round rods D, which pass through sleeves E, and, at their outer ends, are provided with heads F, which latter prevent the rods from passing through the sleeves E entirely. These sleeves are, at their forward ends, suitably pivoted on arms G of the stem H of latch-bolt I, the stem H passing through a guide, J, secured to the side plate. A spring, K, so bears against the latch-bolt I as to keep it always in an outward position. L is the lock-bolt, moving between two dogs, M and N, and provided with a slot, O, through which passes a pin, $o$, secured on the side plate, and on which the dog N is pivoted. This dog N is constructed in S-shape, its upper end having a hook-form, as shown at $n$, which seizes over the end of the dog M and holds the latter in position. A spring, P, operates on the end of dog N to keep it in this position. The dog M is pivoted at $m$, and has two projections, $r$, which catch into corresponding notches $s\ s'$ in the upper edge of bolt L. A spring, R, bears against this dog and keeps it in position to hold the bolt L from sliding forward or backward. The dog M has a downwardly-extending plate, S, against which one of the barbs of the key operates. On the under side of the lock-bolt L is a portion cut away, as shown at $l$, into which another of the barbs of the key seizes to operate the bolt forward or back.

In Fig. 3 I have shown the key provided with three barbs, $a\ b\ c$. The key being placed in the key-hole and being turned, (the lock being unlocked,) the barb $a$ will come in contact with dog N, and, raising its lower end, will force its upper end away from dog M, releasing the same, so that barb $c$ of the key, now operating against plate S, raises the dog and lifts the projections $r$ out of notches $s$, thus leaving the bolt L free to be slid forward by means of barb $b$ of the key, which comes now into operation. As soon as the bolt has completed its movement, barb $c$ leaves plate S of dog M and allows the projections $r$ to fall into the notches $s'$, at which moment dog N, being released from barb $a$, again seizes over dog M and holds all parts in position. In unlocking, the operation is precisely the same, the barbs of the key only moving in reverse direction.

Having thus described my invention, what I claim as new, and desire to secure by Letters Patent, is—

1. The combination of the pivoted rods D, sleeves E, arms G, guide J, and stem H with the hub B, all constructed and arranged to operate the latch-bolt, substantially in the manner herein shown and described.

2. The combination of the dog M, lock-bolt L with slot O, dog N pivoted on pin $o$, and springs P R, all constructed and arranged to be operated by the same key and in a single operation, as described.

TANNIS A. OLSON.

Witnesses:
 B. RAMSLAND,
 A. HUGHES.